R. WHITE.

Revolving Fire-Arms.

No. 5,691. Reissued Dec. 16, 1873.

WITNESSES

Henry N. Miller
F. A. Lehmann

By

INVENTOR

R. White
per
Alexander Mitchell

Attorneys.

AM. PHOTO-LITHOGRAPHIC CO. N.Y. (OSBORNE'S PROCESS)

UNITED STATES PATENT OFFICE.

ROLLIN WHITE, OF LOWELL, MASSACHUSETTS.

IMPROVEMENT IN REVOLVING FIRE-ARMS.

Specification forming part of Letters Patent No. 143,394, dated September 30, 1873; reissue No. 5,691, dated December 16, 1873; application filed November 10, 1873.

*To all whom it may concern:*

Be it known that I, ROLLIN WHITE, of Lowell, in the county of Middlesex and in the State of Massachusetts, have invented certain new and useful Improvements in Revolving Fire-Arms; and do hereby declare that the following is a full, clear, and exact description thereof, reference being had to the accompanying drawings and to the letters of reference thereon, making part of this specification.

The nature of my invention relates to an improvement in fire-arms; and it consists in the arrangement and combination of parts, which will be more fully described hereafter.

Figure 2:
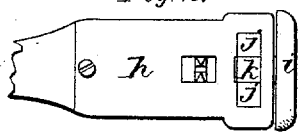
Figure 1:
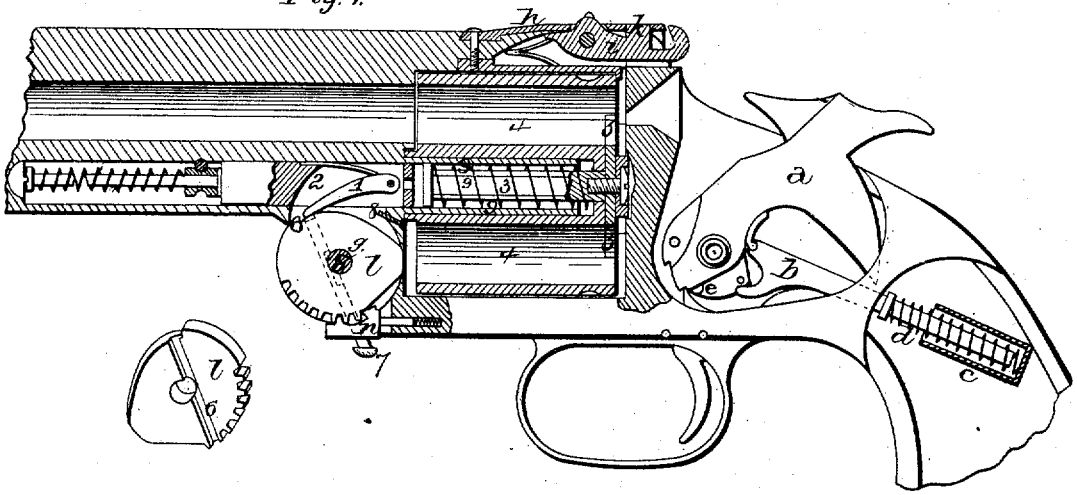
Figure 3:
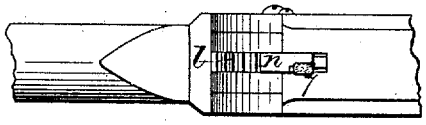
Figure 4:
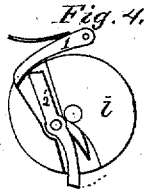

Figure 1 is a longitudinal section of my invention. Fig. 2 is a plan view of the locking-spring. Fig. 3 is an inverted view of my invention, and Fig. 4 a modification of the same.

*a* represents the hammer or cock, which, instead of being thrown forward by a spring in the usual manner, is operated by the spring-rod *b*, which extends backward into the handle, and has its rear end held in a socket, *c*, in which is placed a suitable spring, *d*. The front end of this rod is bifurcated, the upper branch having a small recess cut in it, which fits over a small projection on the rear end of the hammer, and keeps the rod in position, while the lower branch strikes against a projection, *e*, and regulates the position which the hammer will take after striking the cartridge. When the trigger is pulled, the spring-rod *b* throws the hammer forward to explode the cartridge, and then allows it to recoil to the half-cock, so that the end of the hammer will not strike against the next cartridge as the cylinder is revolved. The barrel is pivoted upon the pin *g*, and is locked in position to the top of the breech by the spring-plate *h*, fastened to the top of the barrel, as shown in Figs. 1 and 2. Pivoted in a recess in the rear end of the barrel is a lever or bolt, *i*, which extends over the two projections, *j*, formed upon the top of the breech, and which serves as a lever to raise the spring locking-plate *h* from the rear end of the barrel just far enough to clear and unlock it from the projections *j*. This lever forms a stop or locks the spring locking-plate, so that it will not be strained or broken by raising the rear portion of the barrel from the breech. When the lever or bolt *i* is in the position as represented in Fig. 1, by an eccentric or cam it locks the spring-catch which holds the cylinder to the barrel, and, while thus locked, the spring-catch cannot be raised or the cylinder removed from the barrel; but, by raising the rear end of the lever, the cam turns from the spring-catch, and leaves a space, so that the said catch can be raised and the cylinder taken from the barrel without taking out or unfastening any other parts of the arm. The cam *l*, which forms a portion of the hinge, is fastened to the lock-frame, and moves with said frame, while the barrel turns on this hinge for the purpose of operating the ejector. Upon its upper edge is formed a square shoulder or recess, *o*, against which the pawl 1 catches as the cam is moved by the tilting downward of the barrel. This pawl is pivoted to the piston 2, and, as the cam pushes the piston backward, it strikes against the rod 3 placed in the cylinder 4, and pushes the ejector 5 outward and dislodges the shell. Projecting at an angle upward through the spring-catch *n*, and through the groove 6 cut in the side of the cam *l*, is a vibratory shipping-stud, 7, the upper end of which rests against the under side of the pawl, so that, by a slight upward pressure of the finger, the end of the pawl is released from the shoulder *o*, when the spring-piston at once flies back and releases the ejector. As the cam turns backward, carrying the pawl with it, the under side of the pawl strikes an adjustable stop, 8, which may consist of a screw or any equivalent device, which raises the end of the pawl out of the notch, and releases the ejector automatically as soon as it has displaced the shells. By regulating the screw-stop, the point at which this release will take place can be controlled at will. The cartridge-cylinder 4 revolves freely around upon a small cylinder, 9, which projects from the rear end of the barrel, as shown in Fig. 1. Placed on the pivot-hole through the center of the cylinder is the rod 3, having the ejector 5 formed on its rear end, the rod having a coiled spring placed around it to return the ejector to position after having dislodged the cartridge-shells. This cartridge-ejector is secured to the cylinder, and is entirely disconnected from the mechanism for operating it; wherefore the cylinder has only to be taken off from the barrel to be cleaned without unfastening a single part of said mechanism.

This cylinder can be removed from the barrel by raising the rear end of the cam-lever *i* and the spring-catch under it, while the rear end of the cylinder is turned up from the breech.

Instead of the sliding shipping-stud 7, as shown in Fig. 1, the spring-lever 2 (shown in Fig. 4) may be used, or any other equivalent device which will unship the end of the pawl.

Having thus described my invention, I claim—

1. In a revolving fire-arm, the combination of a piston having and operated by a pawl and a cartridge-extractor disconnected from the mechanism for operating it, substantially as and for the purposes set forth.

2. In a revolving fire-arm, the combination of a piston having a pawl connected therewith, a cartridge-extractor, and a cam stationary on the lock-frame, substantially as and for the purposes set forth.

3. In a revolving fire-arm, the combination of a piston having a pawl, a cartridge-extractor disconnected from the mechanism for operating it, and a cam or stop stationary on the lock-frame, substantially as and for the purposes set forth.

4. In a revolving fire-arm having a removable extractor, an operating-piston made separate and independent from the extractor, and operating in a line therewith, substantially as and for the purposes set forth.

5. The adjustable stop 8 for automatically releasing or unshipping the pawl 1 at any desired or predetermined point in the act of tilting the barrel, as described.

6. The cam *l*, in combination with the pawl 1, stop 8, and piston for operating the cartridge-extractor, substantially as specified.

7. The combination, with a hinged barrel of a fire-arm, of the pivoted spring locking-bolt *i*, having a projection, *k*, the slotted spring locking-plate *h*, and the projections *j* on the breech, all substantially as and for the purposes set forth.

8. The lever-cam *i*, in combination with the spring-catch which locks the cylinder, substantially as herein set forth.

9. The combination, in a revolving fire-arm, of the hammer *a* and spring-bolt *b*, having the double bearing shown, whereby a rebounding lock or hammer is obtained, as set forth.

ROLLIN WHITE.

Witnesses:
WELLS W. LEGGETT,
WM. H. BRERETON, Jr.